May 12, 1970    K. STEISSLINGER ET AL    3,511,153
FILM COUNTING MECHANISM FOR PHOTOGRAHIC CAMERAS
Filed Aug. 23, 1967
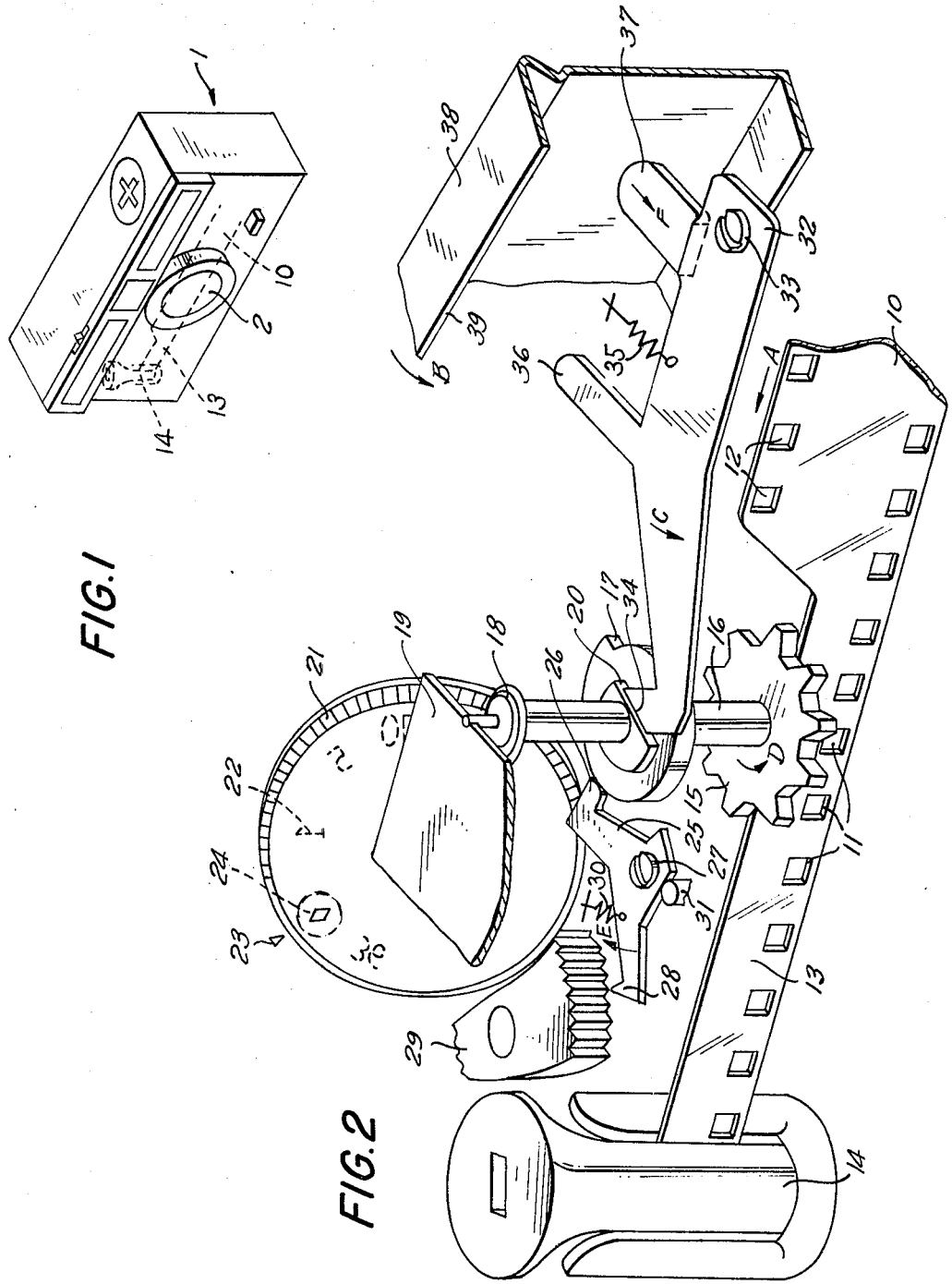
INVENTORS
KURT STEISSLINGER
HORST SIMON May 12, 1970     K. STEISSLINGER ET AL     3,511,153
FILM COUNTING MECHANISM FOR PHOTOGRAHIC CAMERAS
Filed Aug. 23, 1967     2 Sheets-Sheet 2

INVENTORS
KURT STEISSLINGER
HORST SIMON
BY
ATTORNEYS

United States Patent Office 3,511,153
Patented May 12, 1970

3,511,153
FILM COUNTING MECHANISM FOR
PHOTOGRAPHIC CAMERAS
Kurt Steisslinger, Stuttgart-Hedelfingen, and Horst Simon, Fellbach, near Stuttgart, Germany, assignors to Eastman Kodak Company, Rochester, N.Y., a corporation of New Jersey
Filed Aug. 23, 1967, Ser. No. 662,714
Claims priority, application Germany, Sept. 2, 1966, K 60,168
Int. Cl. G03b 19/04
U.S. Cl. 95—31                                             13 Claims

ABSTRACT OF THE DISCLOSURE

A film metering mechanism in which a sprocket wheel, which is driven by advancing film, actuates a film transport blocking pawl. Frame registration for reloaded film is achieved by a lever that, upon opening of the camera back, moves into abutment with a fixed locking surface connected to the sprocket wheel, stopping the sprocket wheel in a predetermined angular position and preventing its further rotation until the camera back is closed or the lever is manually disengaged from the sprocket wheel.

BACKGROUND OF THE INVENTION

Field of the invention

This invention relates generally to counting mechanisms, and particularly to film counting mechanisms of the type used in photographic apparatus.

Description of the prior art

Film counting mechanisms, including those driven by engagement with perforations in an advancing film strip, are well known in the art. In general, such known mechanisms comprise a sprocket that is rotated by engagement with perforations placed at the edge of the film strip. When the film strip is wound onto a take-up spool, the rotating sprocket, through various linkages, acts to turn an indicator showing the number of frames exposed or remaining to be exposed.

Counting mechanisms of the prior art, however, have been extremely complicated and, therefore, expensive. Further, the prior-art devices have been unable to compensate for incompletely exposed film strips that are reinserted into the camera. When the incompletely exposed film is reinserted, it is desirable to be able again to count the number of frames exposed, and it is even more important that there be an exact registration of the last exposed frame to prevent overlap of exposures or wasting of film.

The prior-art devices have been unable to accomplish this exact registration of the edge of a previously exposed frame. The former devices, in general, have been directly connected with the film advancing mechanism or with the shutter cocking mechanism, and have been incapable of providing an exact registration of the exposed frames upon reinsertion of a cartridge or other type of film roll into the camera.

SUMMARY OF THE INVENTION

This invention provides a film counting mechanism for a photographic camera that is simple and economical to manufacture and assemble. It further provides a film counting mechanism that assures counting from a single initial position. It still further provides a film counting mechanism for a photographic camera that assures exact registration of exposed frames upon reinsertion of the film in the camera.

In accordance with this invention, the film counting mechanism is constructed in such a way that movement of the film counting mechanism always starts at the same perforation on the film strip. Further, the same tooth on the sprocket engaged by the film strip, which drives the counting mechanism, is always reached with each frame advance.

The sprocket, which is driven by the movement of the film strip, is attached, through various linkages, to the frame exposure counter and to the film advance mechanism. Further, means are provided, attached to the nonoperating portions of the camera, to lock the sprocket in a particular position whenever the camera is opened. This locking action sets the sprocket, and through it the film counting mechanism, to a single initial point each time a film roll or cartridge is inserted. This assures both an accurate count of the exposed frames and exact registration of adjacent exposed frames with no overlap or unused film.

BRIEF DESCRIPTION OF THE DRAWINGS

In the accompanying drawings:
FIG. 1 is a perspective view of a camera having the film counting mechanism of the present invention;
FIG. 2 is an enlarged, fragmentary perspective view of the film counting mechanism and associated apparatus, showing the film counting mechanism in the initial locked position when the cover of the camera is open.

DESCRIPTION OF THE PREFERRED

Figure 3:
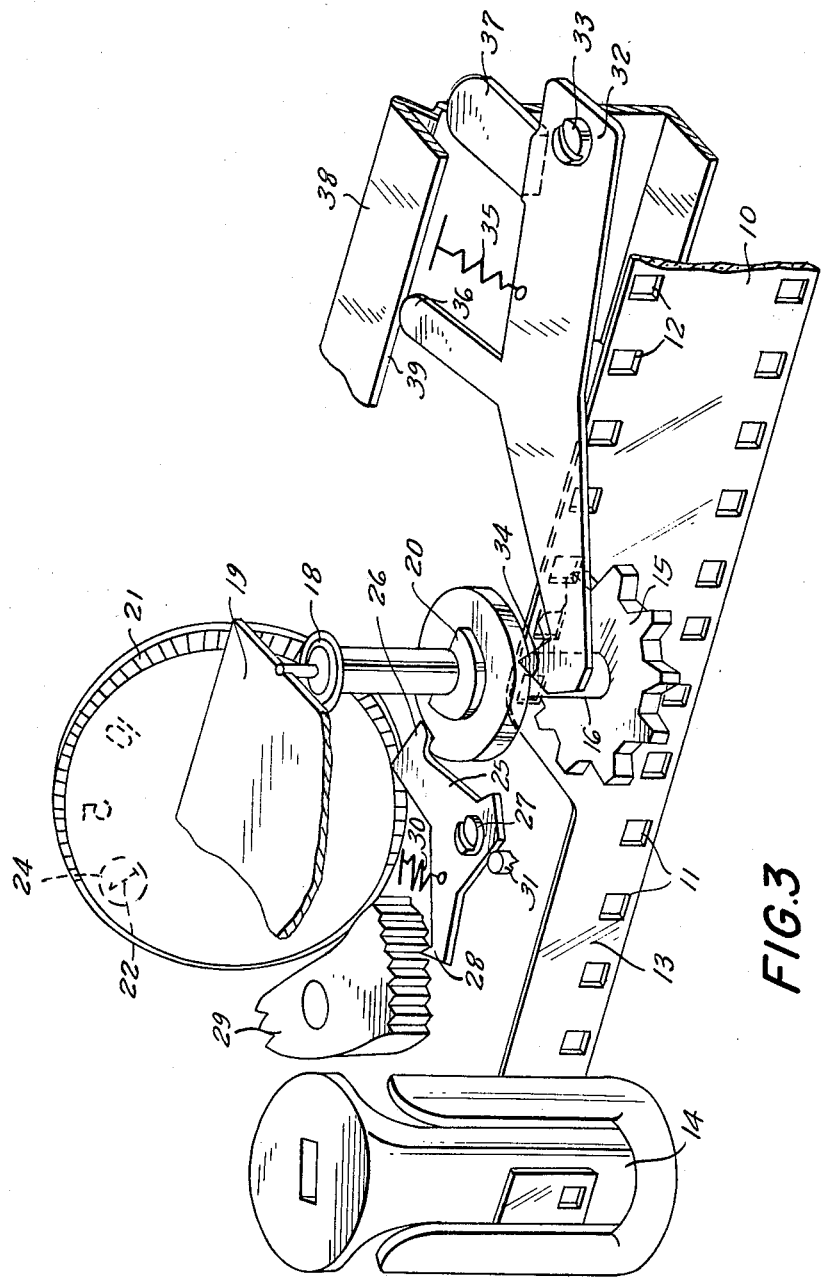
FIG. 3 is a view similar to FIG. 2 but showing the film counting mechanism in position for counting frame exposures, as when the cover is closed.

Referring to FIG. 1, a camera 1 is shown with a taking lens 2. Portions of the film strip 10, with its leader strip 13 and take-up spool 14, are shown by hidden lines in FIG. 1 and by solid lines in FIGS. 2 and 3.

The film counting mechanism of the preferred embodiment is located within camera 1 between taking lens 2 and take-up spool 14. Film strip 10, having a lower row of perforations 11 and an upper row of perforations 12, is shown loaded into camera 1. Leader strip 13 of film 10, which is inserted into take-up spool 14, has only the lower row of perforations 11.

The film counting mechanism includes a metering sprocket 15 attached by a shaft 16 to a cam 17 and a worm gear 18. The upper portion of shaft 16, above worm gear 18, is rotatably attached to the body 19 of camera 1. A raised locking surface 20 is rigidly attached to the top of cam 17.

A worm wheel 21 is engaged by worm gear 18. A scale 22, to indicate the number of frames exposed, is formed on worm wheel 21 in any desired manner, and the particular number of the frame exposure can be read at an index 23, disposed at the back of camera 1, or through a window 24 provided in the camera back.

A pivoted lever 25 adjacent to cam 17 has a cam-follower portion 26 engageable with cam 17. Lever 25 is pivotally mounted by means of pin 27 to permit rotational movement of lever 25 as cam 17 is rotated. The opposite end of lever 25 is in the form of a pawl 28 which engages a film transport ratchet wheel 29 (only a portion of which is shown). Lever 25 is biased by spring 30, attached to camera 1, against cam 17. Rod 31 is mechanically connected to the camera shutter mechanism (not shown) so that, upon release of the shutter, rod 31 rotates lever 25 about pin 27 in a counterclockwise direction, as viewed in FIG. 2, to disengage pawl 28 from ratchet wheel 29.

The locking mechanism includes a locking lever 32, pivotally attached to camera 1 by pin 33. Locking lever 32 has an edge 34 formed to seat against locking surface 20. A tension spring 35, also attached to camera 1, aids in urging edge 34 against locking surface 20. Lever 32 is preferably mounted above the camera film gate (not shown). Locking lever 32 is provided with a longer lug 36 and a shorter lug 37 which project through apertures (not shown) in the vicinity of the film gate. When the camera back 38 is opened, projecting lugs 36 and 37 are visible from the rear of camera 1. Longer lug 36 is adapted to be engaged by the bent edge 39 on camera back 38 when back 38 is closed.

In operation, when camera back 38 is opened, locking lever 32, under the influence of spring 35, is pulled toward the back of camera 1 so that edge 34 engages locking surface 20. This engagement prevents movement of the film counting mechanism during loading of film 10.

The roll or cartridge of film 10 is then placed in the appropriate portion of camera 1, and leading strip 13, which contains only the lower row of perforations 11, is placed in take-up spool 14. Take-up spool 14 is rotated to move film 10, in the direction indicated by arrow A, until the first perforation in upper row 12 comes in contact with a tooth on sprocket 15. Because sprocket 15 forms a portion of the film counting mechanism, which is locked by the engagement of locking lever 32 with locking surface 20, further movement of film 10 is not possible until locking lever 32 is disengaged.

Two means are provided for disengaging locking lever 32. In normal camera operation, the action of closing camera back 38, by movement thereof in the direction indicated by arrow B, causes bent edge 39 to engage longer lug 36 and move locking lever 32 in the direction indicated by arrow C. This movement of locking lever 32 causes it to assume the position shown in FIG. 3, i.e., disengaged from locking surface 20 so that the film counting mechanism is now free to move.

Further rotation of take-up tool 14 causes continued travel of film strip 10 in the direction of arrow A, which, in turn, causes rotation of sprocket 15 and cam 17 in the direction indicated by arrow D. Film advance and movement of the film counting mechanism are arrested when lever 25 is pulled by spring 30 in the direction indicated by arrow E, as permitted by the reduced-radius portion of cam 17, causing engagement of pawl 28 with ratchet wheel 29. This arresting of motion, through appropriate conformation of cam 17, provides a precise and reliable way of maintaining frame length.

During rotation of sprocket 15, shaft 16 is also turned, causing rotation of worm gear 18 and worm wheel 21, to which is affixed scale 22 indicating the number of exposures. Worm wheel 21 and scale 22 are so calibrated that each rotation of sprocket 15 and cam 17, prior to being stopped by the action of pawl 28, results in an advance of one number on scale 22, as indicated at index 23 or window 24.

When the entire roll of film 10 has been exposed, it is rewound into its cartridge and may, simultaneously, act to return scale 22 to its zero position through the film counting mechanism, or the mechanism can be bypassed and scale 22 returned by other means.

If a film cartridge is removed from the camera prior to exposure of the entire film strip, by means of the mechanism of the present invention it is possible to reinsert the cartridge for further exposure and still assure accurate registration of subsequently exposed frames. For example, if the film is rewound into the cartridge after being only partially exposed, the cartridge can be reinserted in the camera in the same way as one containing a completely unexposed film would be. Since locking lever 32 holds the film counting mechanism in exactly the same position it was in when the film was originally inserted, the first perforation in the upper edge of the film strip will engage sprocket 15 at exactly the same tooth. Thus, there will be an exact registration between the previously exposed frames and the unexposed ones upon reinsertion of the film cartridge in the camera, For example, if five frames have been exposed and the film then rewound into its cartridge, upon reinsertion of the cartridge in the camera the film advance can be wound until the sixth frame number appears, and the fifth frame, which has been exposed, will immediately clear the film gate.

On the other hand, if the film counting mechanism has not been restored to its original setting, as when a film cartridge is removed from the camera without first rewinding the film completely into it, then an appropriate adjustment can be made manually to return the film counting mechanism to its original setting. In this case, with camera back 38 open, lug 37 on locking lever 32 can be moved manually in the direction indicated by arrow F to release locking lever 32 from locking surface 20, and the film counting mechanism can then be turned manually until the starting point on scale 22 is reached. When another film cartridge is then inserted in the camera, the first perforation in the upper row of its film strip will engage the same tooth on sprocket 15 as would any newly inserted film strip.

The invention has been described in detail with particular reference to a preferred embodiment thereof, but it will be understood that variations and modifications can be effected within the spirit and scope of the invention as described hereinabove and as defined in the appended claims.

We claim:
1. A mechanism for counting and registering a series of adjacent exposure frames on a perforated film strip movable for sequential exposure past exposure means in a camera having a movable opening member for inserting and removing film, comprising:
  (a) a metering sprocket having teeth engageable with perforations in said strip and rotatable by movement of said strip past said exposure means;
  (b) frame identifying means responsive to rotation of said sprocket to sequentially identify said frames;
  (c) means for moving said film strip past said exposure means;
  (d) arresting means responsive to rotation of said sprocket to arrest movement of said moving means when said strip has been moved a distance of one frame; and
  (e) means engageable with said sprocket to hold said sprocket in a predetermined angular position in response to moving said opening member for insertion or removal of said film.

2. The mechanism claimed in claim 1 wherein said holding means comprises:
  (a) a locking surface rotatable in response to rotation of said sprocket; and
  (b) a movable locking member actuated to engage said locking surface in response to moving said opening member.

3. The mechanism claimed in claim 2 further comprising means operatively connected to said locking member for disengaging said locking member from said locking surface to release said sprocket.

4. The mechanism claimed in claim 2 wherein:
  (a) said opening member is movable in one direction to open said camera and is movable in another direction to close said camera; and
  (b) said locking member is actuated by movement of said opening member in said one direction to become engaged with said locking surface, and is actuated by movement of said opening member in said other direction to become disengaged from said locking surface.

5. The mechanism claimed in claim 4 further comprising means operatively connected to said locking member for manually disengaging said locking member from said locking surface to release said sprocket.

6. The mechanism claimed in claim 4 wherein:
  (a) said opening member comprises a camera wall member movable in said one direction to an open position and movable in said other direction to a closed position; and
  (b) said locking member is pivotally attached to said camera for pivotal movement relative thereto, is provided with biasing means attached to said camera for biasing said locking member into engagement with said locking surface when said wall member has been moved to said open position, and includes first and second release portions, said first release portion being engageable by said wall member when said wall member is moved to said closed position to move said locking lever out of engagement with said locking surface, said second release portion being engageable manually when said wall member is in said open position to move said locking lever out of engagement with said locking surface.

7. The mechanism claimed in claim 1 further comprising means, operatively connected to said exposure means, for releasing said arresting means to permit further movement of said strip and rotation of said sprocket after exposure of a frame.

8. The mechanism claimed in claim 1 wherein said arresting means comprises:
   (a) a cam actuatable in response to rotation of said sprocket;
   (b) ratchet means operatively connected to said moving means; and
   (c) control means comprising a cam follower movable by said cam and a pawl actuated by movement of said cam follower to engage said ratchet means to arrest movement of said moving means in response to rotation of said sprocket by an amount corresponding to strip movement of one frame.

9. The mechanism claimed in claim 8 further comprising means, operatively connected to said exposure means, for releasing said arresting means to permit further movement of said strip and rotation of said sprocket after exposure of a frame, said releasing means including a member actuatable by operation of said exposure means to disengage said pawl from said ratchet means.

10. The mechanism claimed in claim 1 wherein said holding means and said arresting means are coordinated with the angular position of said sprocket by a relationship preventing simultaneous operation of said holding means and said arresting means.

11. The mechanism claimed in claim 1 wherein said holding means comprises:

(a) a locking surface rotatable in response to rotation of said sprocket; and
(b) a movable locking member actuated to engage said locking surface in response to moving said opening member; and wherein said arresting means comprises:
(c) a cam actuatable in response to rotation of said sprocket;
(d) ratchet means operatively connected to said moving means; and
(e) control means comprising a cam follower movable by said cam and a pawl actuated by movement of said cam follower to engage said ratchet means to arrest movement of said moving means in response to rotation of said sprocket by an amount corresponding to strip movement of one frame; and wherein said locking surface and said cam are positioned relative to one another to permit engagement of said locking member with said locking surface and engagement of said pawl with said ratchet means only at mutually exclusive angular positions of said sprocket.

12. The mechanism claimed in claim 1 wherein said identifying means comprises:
   (a) gear means drivingly connected to said sprocket; and
   (b) a scale affixed to said gear means for rotation therewith to indicate the number of frames that have been exposed.

13. The mechanism claimed in claim 12 further comprising indexing means associated with said scale for registering the number of frames exposed.

References Cited

UNITED STATES PATENTS

| | | |
|---|---|---|
| 2,621,866 | 12/1952 | Harvey. |
| 2,652,209 | 9/1953 | Hodges. |
| 2,879,704 | 3/1959 | Winkler _____ 95—31 |
| 3,121,378 | 2/1964 | Lange _____ 95—31 |
| 3,412,665 | 11/1968 | Greger _____ 95—31 |

NORTON ANSHER, Primary Examiner

D. S. STALLARD, Assistant Examiner